United States Patent [19]
Beck

[11] Patent Number: 4,732,013
[45] Date of Patent: Mar. 22, 1988

[54] FREEZER WITH HELICAL SCRAPER BLADE

[75] Inventor: Norman L. Beck, Rockton, Ill.

[73] Assignee: Taylor Freezer Company, Rockton, Ill.

[21] Appl. No.: 526,609

[22] Filed: Aug. 26, 1983

[51] Int. Cl.[4] .............................................. A23G 9/12
[52] U.S. Cl. .................................... 62/343; 15/250.41
[58] Field of Search ................. 62/342, 343; 15/250.41

[56] References Cited

U.S. PATENT DOCUMENTS

| | | | |
|---|---|---|---|
| 1,846,885 | 2/1932 | Manuel | 15/250.41 X |
| 2,063,375 | 12/1936 | Harvey et al. | 15/250.41 X |
| 2,324,365 | 7/1943 | Coutts | 15/250.41 |
| 2,746,730 | 5/1956 | Swenson et al. | 62/342 |
| 2,788,643 | 4/1957 | Martin | 62/342 |
| 2,809,815 | 10/1957 | Born | 62/342 X |
| 2,836,401 | 5/1958 | Phelan | 62/342 |
| 3,050,960 | 8/1962 | Clifford | 62/342 |
| 3,147,601 | 9/1964 | Tacchella | 62/343 X |
| 3,417,421 | 12/1968 | Retke | 15/250.41 |
| 3,497,115 | 2/1970 | Cornelius | 222/544 |

FOREIGN PATENT DOCUMENTS

| | | | |
|---|---|---|---|
| 854481 | 4/1940 | France | 15/250.41 |
| 190301 | 4/1937 | Switzerland | 15/250.41 |

Primary Examiner—William E. Tapolcai
Attorney, Agent, or Firm—Vernon J. Pillote

[57] ABSTRACT

A comestible freezer of the type having a freezing barrel and a rotor in the barrel. The rotor has rigid flight bars extending in helical fashion along the inner surfce of the barrel and spaced inwardly therefrom, and a scraper blade of resilient plastic material is provided with a lengthwise extending channel to receive the flight bar so that the blade conforms to the helix of the flight bar. The scraper blade has two blade portions that extend in opposite directions from the channel and resiliently engage the inner surface of the freezing barrel to scrape frozen comestible from the freezing barrel and feed the comestible lengthwise of the barrel.

9 Claims, 5 Drawing Figures

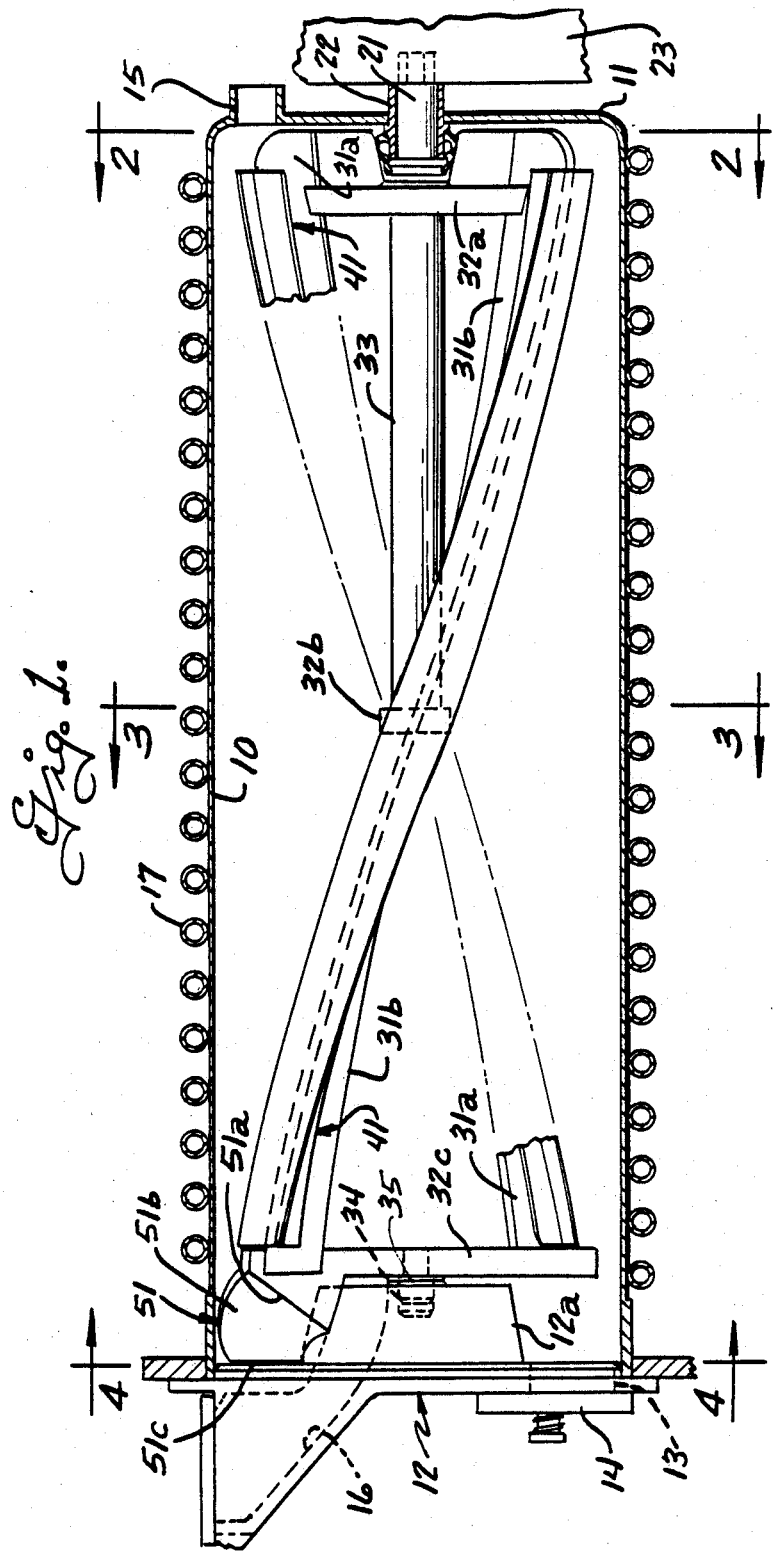

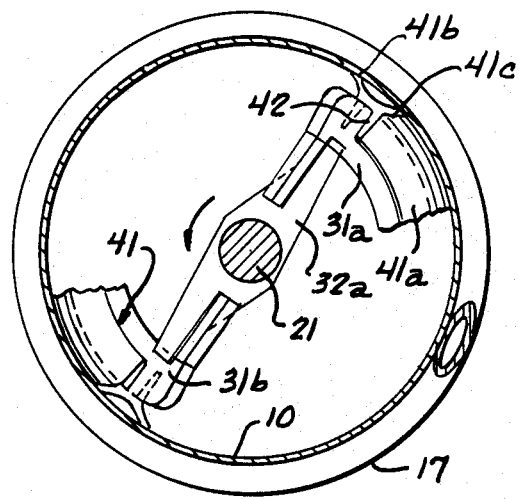
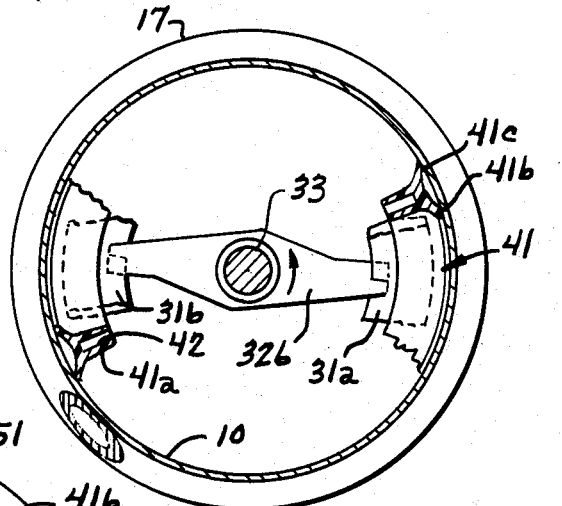
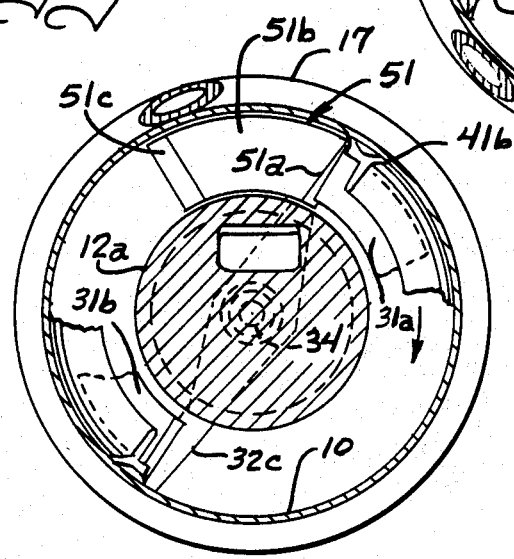
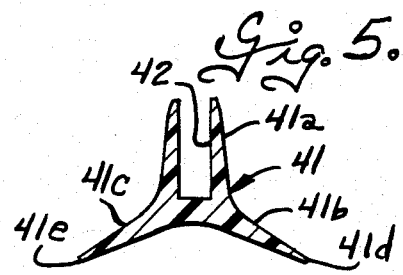

FREEZER WITH HELICAL SCRAPER BLADE

BACKGROUND OF THE INVENTION

The present invention relates to comestible freezers of the type having a freezing barrel with a rotor in the barrel for scraping frozen product off the inner surface of the barrel, mixing the product in the barrel, and feeding the frozen product to a discharge outlet adjacent one end of the barrel. Some frozen comestible machines utilize a rigid rotor in which the helical flight bars extend sufficiently close to the inner surface of the freezing barrel to scrape the frozen product off the barrel. However, such machines require accurate and expensive machining of the inner surface of the freezing barrel and the outer edges of the scraper blades to achieve the proper close running fit. Moreover, such machines are subject to wear on the freezing barrel and/or scraper blades if there is rubbing contact therebetween. On the other hand, if the scraper blade is spaced inwardly from the freezing barrel so that the blade does not completely remove the product from the inner surface of the freezing barrel, then the efficiency of the machine is reduced.

Many comestible freezers have rotors with scraper blades that extend parallel to the axis of the barrel for removing frozen product from thje barrel, and a separate helical flight bar for advancing product from the barrel. Some of these freezers, for example as shown in U.S. Pat. Nos. 2,746,730 and 2,836,401, pivotally mount the scraper blades on the rotors so that the blades ride against the freezing barrel. In some comestible freezers such as shown in U.S. Pat. Nos. 2,788,643; 3,050,960; and 3,497,115, plastic blades are used to reduce scoring of the freezing barrel. However, the scraper blades that extend parallel to the axis of the barrel do not aid in advancing the product along the barrel to the discharge outlet and instead impede advancement of the product by the separate helical flight bar.

SUMMARY OF THE INVENTION

It is an object of the present invention to overcome the disadvantages of the prior art by providing a comestible freezer in which a scraper blade of synthetic resin material is mounted on the rotor to extend in helical fashion along the inner surface of the freezing barrel and which has blade portions that resiliently engage the inner surface of the freezing barrel to both scrape frozen product from the freezing barrel and advance the frozen product to a discharge outlet at one end of the barrel.

Accordingly, the present invention provides a comestible freezer of the type having a freezing barrel and a rotor with at least one rigid flight bar extending in helical fashion along the inner surface of the barrel, a scraper blade of resilient synthetic resin material having a mounting portion defining a channel extending lengthwise of the blade for receiving a portion of the helical flight bar and first and second blade portions extending in relatively opposite directions from the mounting portion adjacent the bottom of the channel, the scraper blade conforming to the helix of the flight bar when mounted thereon and the blade portions resiliently engaging the inner surface of the barrel to scrape product therefrom.

These, together with other objects, features and advantages of this invention will be more readily understood by reference to the following detailed description, when taken in connection with the accompanying drawings wherein:

FIG. 1 is a longitudinal sectional view through the freezing barrel of a comestible freezer embodying the present invention;

FIG. 2 is a transverse sectional view taken on the plane 2—2 of FIG. 1;

FIG. 3 is a transverse sectional view taken on the plane 3—3 of FIG. 1;

FIG. 4 is a transverse sectional view taken on the plane 4—4 of FIG. 1; and

FIG. 5 is a transverse sectional view through a scraper blade.

Referring more particularly to the drawings, the freezer includes a generally horizontally disposed freezing barrel 10 having a rear wall 11 at one end and a door or cover 12 removably mounted on the other end of the barrel. A discharge outlet 13 is provided in the door 12 and flow of product through the outlet is controlled by a valve 14, herein shown in the form of a swingably mounted gate valve. A liquid comestible such as ice cream, custard, yogurt mix or the like is introduced into the barrel and may be introduced either through an inlet opening 15 in the rear end 11 of the barrel or through an inlet opening 16 in the upper portion of the door 12. The barrel is refrigerated to freeze product on the inner surface thereof and, as shown in FIG. 1, the evaporator 17 of a conventional refrigeration mechanism (not shown) is disposed around the outer side of the freezing barrel. As is conventional, the refrigerating mechanism includes a compressor, condenser and expansion control, and the refrigerating mechanism is operated under a temperature responsive controller to maintain the freezing barrel at the desired temperature for freezing the comestible on the inner surface of the barrel.

A rotor is removably mounted in the freezing barrel for removing the frozen product from the inner surface of the barrel, mixing and/or aerating the product in the barrel and for advancing the product toward the discharge outlet 13 at one end of the barrel. A drive shaft 21 extends through a bearing 22 in the wall 11 of the barrel and is driven from a beater drive mechanism 23, of conventional construction.

The rotor is formed of metal such as stainless steel and includes at least one and preferably two or more flight bars, herein shown two in number and designated 31a and 31b. The flight bars are rigidly interconnected as by crossheads 32a, 32b and 32c to form a rigid rotor structure. In the embodiment shown, the crossheads 32a and 32b are interconnected by a shaft 33 that extends axially of the rotor and is non-rotatably connected to the drive shaft 21 for rotation thereby. The crosshead 32c at the other end of the rotor has an axial pin 34 that is rotatably supported in a bearing 35 in the door 12. The flight bars are arranged to extend in helical fashion along the inner side of the freezing barrel with their outer edge spaced inwardly a substantial distance from the inner surface of the freezing barrel and the flight bars are preferably in the form of relatively wide flat strips whose opposite side faces extend generally radially of the freezing cylinder at all points therealong.

A scraper blade 41d, formed of a resilient synthetic resin material, is provided on each of the flight bars and arranged to conform to the helix of the flight bar. The scraper blade 41 may, for example, be formed of a resilient plastic material such as polyethylene, nylon or the like which do not become brittle at the temperatures encountered in the comestible freezer. The scraper blade has a generally tri-lobular cross section. A first lobe 41a of the blade provides a mounting portion and is formed with a longitudinally extending channel 42 for receiving a radially outer portion of a respective one of the flight bars 31a, 31b. The scraper blade also has second and third lobes 41b and 41c that extend in relatively opposite directions from the first lobe adjacent the bottom of the channel and which terminate in lengthwise extending edges 41d and 41e. The scraper blade 41 is preferably formed as a straight extrusion of the resilient synthetic resin material and, when mounted on the helical flight bar, the tri-lobular blade twists to conform to the helix of the flight bar. As previously described, the flight bar is preferably in the form of a wide flat bar having opposite side faces that extend generally radially of the barrel at all points therealong, and the channel 42 is formed with a depth substantially greater than its width so that the scraper blade can closely follow the configuration of the flight bar. The scraper blade is arranged to receive the flight bar with the outer edge of the flight bar engaging the bottom of the channel 42, and the lobe portions 41b and 41c extend outwardly from the base of the channel a distance greater than the spacing between the outer edge of the flight bar and the feezing cylinder so that the lobes 41b and 41c must deform radially inwardly to a limited degree when the rotor and scraper blades are inserted into the barrel. The thickness of the lobes or blade portions 41b and 41c is selected in conjunction with the resilience of the material used in the blade so that the lengthwise extending edges 41d and 41e on the second and third lobes each resiliently engage the inner surface of the barrel. As best shown in FIG. 5, the lobes 41b and 41c progressively decrease in thickness in a direction from the first lobe 41a toward the free edges of the lobes 41b and 41c so that the lobes have their maximum resilience adjacent their free edges. The outer faces of the second and third lobes 41b and 41c, that is the faces opposed to the freezing barrel, define an included angle of less than 180 degrees so that the blade is recessed away from the freezing barrel at locations intermediate the edges 41d and 41e. The lobes 41b and 41c advantageously extend symmetrically with respect to a plane that bisects the channel so that the blade can be reversed and repositioned on the respective flight bar, to enable either edge of the scraper blade to be used as the lead edge, in case one edge becomes worn or dull. The second and third lobes 41b and 41c converge inwardly and merge in a smooth transversely concave curve with the outer surface of the first lobe. Thus, the scraper blade, when mounted on the helical flight bar, extends in helical fashion along the inner surface of the freezing barrel to resiliently engage the freezing barrel and scrape frozen product therefrom and to feed the frozen product in a direction longitudinally of the barrel toward the discharge outlet and also move the frozen product inwardly for improved mixing. Since the lead and trail edges of the scraper blade engage the freezing wall at circumferentially spaced locations at opposite sides of a plane bisecting the channel, movement of the lead scraper blade away from the surface of the freezing barrel is counteracted by the trailing scraper blade. As shown in FIGS. 1 and 4, the crosshead 32c extends outwardly of the outer edge of the flight bars 31a and 31b and forms a stop to limit endwise movement of the scraper blades 41 in a direction toward the door 12. The scraper blades can be installed on the flight bars prior to insertion of the rotor into the freezing barrel by sliding them onto the flight bars beginning at the ends adjacent crosshead 31a or by pressing the scraper blades radially onto the flight bars while twisting the scraper blades to cause the channels to receive the flight bars.

The rotor illustrated is a presently preferred embodiment for comestible freezers for freezing relatively stiff products such as hard ice cream, and the flight bars have a relatively shallow helix angle, herein shown of the order of 18 degrees to 20 degrees to provide a slow feeding of the frozen comestible to the outlet end of the barrel. A product ejector blade 51 is preferably provided on the auger adjacent the outlet end of the barrel to aid in forcing product through the outlet 13. As shown in FIGS. 1 and 4, the ejector blade 51 is formed integrally with the crosshead 32c and is in the form of an arcuate segment that has its outer periphery disposed adjacent the inner side of the freezing barrel and its inner periphery disposed adjacent a hub 12a on the door. The ejector blade has a lead edge 51a inclined to a plane perpendicular to the rotor axis as shown in FIG. 1 and a face 51b that converges toward the door and terminates in a trail face 51c disposed closely adjacent the inner surface of the door. As will be apparent, the face 51b will force product toward the door and through the outlet 13 when the valve 14 is open.

The scraper blades can be easily removed from the flight bars for cleaning and/or replacement. Since the helical scraper blades both scrape frozen product from the freezing wall and advance the product to a discharge outlet, separate longitudinally extending blades for scraping product from the freezing wall are not required. Further, the resilient scraper blade reduces wear and abrasion on the freezing cylinder and also accommodates minor variations in size and concentricity of the beater and freezer barrel.

The embodiments of the invention in which an exclusive property or privilege is claimed are defined as follows:

1. In a comestible freezer of the type having a cylindrical freezing barrel with a discharge outlet adjacent one end, inlet means for supplying comestible to the barrel, refrigeration means surrounding the barrel for freezing comestible on the inner surface of the barrel, and rotor means in the barrel rotatable about the axis of the barrel and having at least one rigid flight bar extending in helical fashion along and spaced inwardly from the inner surface of the barrel for feeding comestible toward the outlet, the improvement comprising a scraper blade of a resilient synthetic resin material having a mounting portion defining a channel extending lengthwise of the blade for receiving at least a radially outer portion of the helical flight bar, the blade having first and second blade portions extending in relatively opposite directions from the mounting portion adjacent the bottom of the channel, the scraper blade conforming to the helix of the flight bar when mounted thereon and the first and second blade portions resiliently engaging the inner surface of the barrel.

2. A comestible freezer according to claim 1 wherein said flight bar has relatively parallel lead and trail faces disposed generally radially of the barrel at all points therealong, the channel having spaced side walls engaging the lead and trail faces of the flight bar and the channel having a depth substantially greater than its width.

3. A comestible freezer according to claim 1 wherein said rotor means has a plurality of said flight bars equiangularly spaced apart about the axis of the rotor means, and one of said scraper blades is provided on each flight bar.

4. In a comestible freezer of the type having a cylindrical freezing barrel with a discharge outlet adjacent one end, inlet means for supplying comestible to the barrel, refrigeration means surrounding the barrel for freezing comestible on the inner surface of the barrel, and rotor means in the barrel rotatable about the axis of the barrel and having at least one rigid flight bar extending in helical fashion along and spaced inwardly from the inner surface of the barrel for feeding comestible toward the outlet, the improvement comprising a scraper blade of resilient synthetic resin material having a tri-lobular cross section, the blade having a first lobe with a longitudinally extending channel opening at the outer edge of the first lobe for receiving at least the radially outer portion of the helical flight bar, the blade having second and third lobes extending in relatively opposite directions from the first lobe adjacent the bottom of the channel and each terminating in a lengthwise extending edge, the scraper blade conforming to the helix of the flight bar when mounted thereon and the second and third lobes each resiliently engaging the inner surface of the barrel along their lengthwise extending edges.

5. A comestible freezer according to claim 4 wherein said second and third lobes extend at like angles from a plane bisecting said channel.

6. A comestible freezer according to claim 4 wherein the second lobe and the third lobe each define a transversely concave outer surface with the outer surface of the first lobe.

7. A comestible freezer according to claim 4 wherein said rotor means has a plurality of said flight bars equiangularly spaced apart about the axis of the rotor means, and one of said scraper blades is provided on each flight bar.

8. A comestible freezer according to claim 4 wherein said second and third lobes progressively decrease in thickness in a direction from said first lobe to its free edge.

9. A comestible freezer of the type having a cylindrical barrel with a discharge outlet adjacent one end, inlet means for supplying comestible to the barrel, refrigeration means surrounding the barrel for freezing comestible on the inner surface of the barrel, and rotor means in the barrel rotatable about the axis of the barrel and having at least one rigid flight bar extending in helical fashion along and spaced inwardly from the inner surface of the barrel with the lead and trail faces of the flight bar disposed generally radially of the barrel, a scraper blade of resilient synthetic resin material having a tri-lobular cross section, the blade having a first lobe with a lengthwise extending channel opening at the outer edge of the first lobe for receiving at least the radially outer portion of the flight bar, the scraper blade having second and third lobes extending in relatively opposite directions from the first lobe adjacent the bottom of the channel and each decreasing in thickness in a direction away from the first lobe and terminating in a lengthwise extending edge, the outer faces of the second and third lobes defining an included angle of less than 180 degrees therebetween, the scraper blade being initially longitudinally straight and said scraper blade being longitudinally twisted and curved in conformance to the helix of the flight bar when mounted thereon, the lengthwise extending edges of the second and third lobes each resiliently engaging the inner surface of the barrel when the bottom of the channel in the first lobe engages the outer edge of the flight bar.

* * * * *